May 1, 1956  F. HOBBS  2,743,980
SPRING-ON SPRING-TIGHT EDGE FACING MOLDING
Filed Jan. 12, 1953
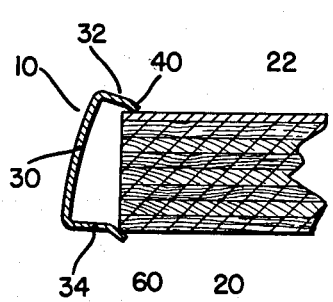
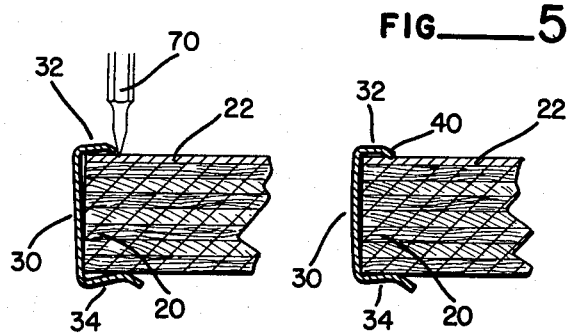
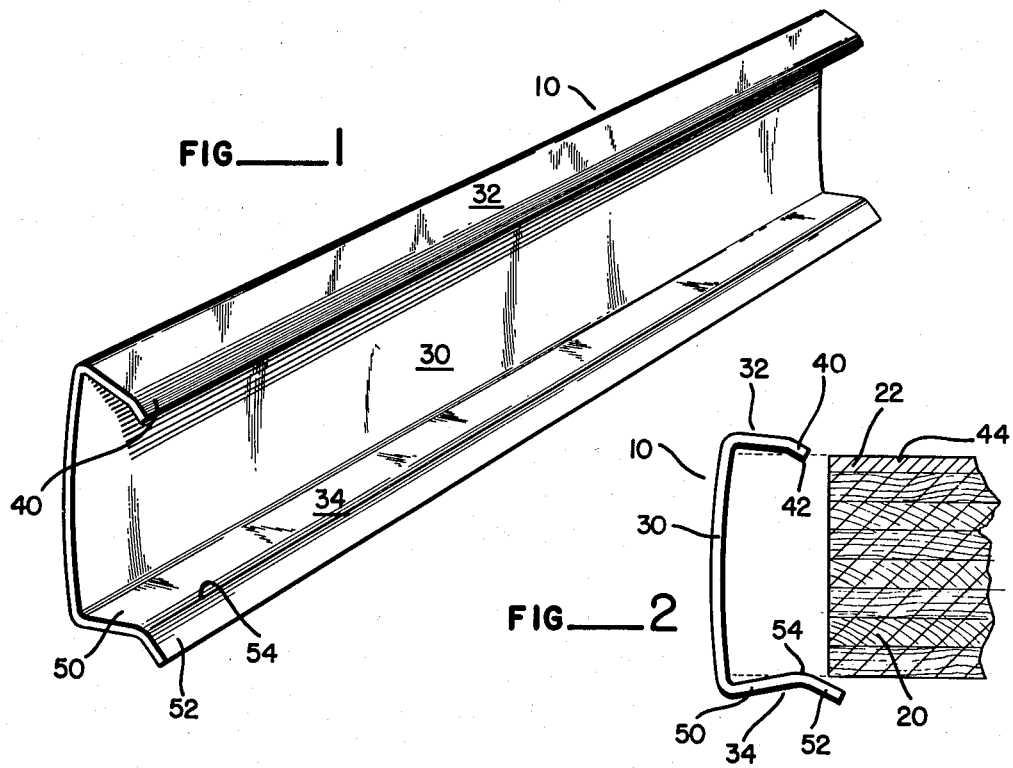
FRANK HOBBS
INVENTOR
BY Smith & Tuck

| United States Patent Office | 2,743,980
Patented May 1, 1956 |
|---|---|

2,743,980

SPRING-ON SPRING-TIGHT EDGE FACING MOLDING

Frank Hobbs, Seattle, Wash., assignor to Colotrym Company, Seattle, Wash., a corporation of Washington Application January 12, 1953, Serial No. 330,691

2 Claims. (Cl. 311—107)

My invention relates to metal moldings for cabinet work and the like and more particularly to a spring-on, spring-tight edge facing molding. The molding is designed for use on a work counter, table, or the like, having an exposed edge of its working surface which this molding is designed to cover. The molding has an upright wall and top and bottom sections extending laterally therefrom to abut the upper face and underside respectively of the counter, said top and bottom sections having single line contact with the surfaces they abut at points equally spaced from the vertical wall, thereby to spring-on and resiliently but tightly secure the molding in place. The molding is formed so as to permit installation merely by snapping the molding in place.

The construction of the interior finish of the kitchen and bathroom facilities in the average newly-constructed home is one of the more expensive features in relation to the over-all cost of such homes. Not only are the materials expensive, i. e., linoleum, plastic sheets, tile, cabinets, and trim, such as moldings, but also the labor involved in the installation is a major item because of the large amount of skilled hand labor required. Many older homes are being remodeled with these materials and equipment at considerable expense in relation to the valuation of the homes. It is important in such construction to minimize the amount of labor required for installation.

Metal moldings are widely used in such assemblies with the objectives of presenting an ornamental appearance, effectively sealing various types of joints and exposed edges, and of presenting a durable covering for joinders subjected to abrasion or excess moisture. It will be understood that the labor involved in making such joints is a substantial portion of the over-all labor cost of constructing or remodeling kitchen or bathroom facilities. Therefore, an important objective in such moldings is to provide for ease of installation.

The present application concerns the protective facing moldings covering the exposed edge of a flat working surface such as a counter. This exposed edge is subject to considerable abrasion so it is desirable to use a metal covering. As various objects are dragged over this edge, and in other respects the molding is subject to various pressures, the facing must be well secured. The joint should be watertight as the top of the counter is subject to considerable moisture. The objects of my invention include, therefore: to provide a facing molding for the exposed edge of a counter or the like; to provide a spring-on molding for such application to minimize labor in installation; to devise a spring-tight molding forming a seal to prevent the entrance of moisture under the molding; and to provide a molding of economical construction which may be easily installed on such counter edge and be capable of withstanding the forces to which it is subjected.

My invention will be best understood, together with additional objectives and advantages thereof, by a reading of the following description, taken with reference to the drawings, in which:

Figure 1 is a perspective view of a molding embodying my construction;

Figure 2 is a view, partly in section, showing the relationship of the molding to the edge which it is to cover; and Figures 3, 4, and 5 are views, similar to Figure 2 showing the steps of installing the molding.

Molding 10 may be formed of various metals having resilient properties so as to be capable of being sprung-on into place and to be effectively secured in place spring-tight against the forces to which it may be subjected. A preferred material is stainless steel.

The exposed edge 20 to be covered by the molding is typically the edge of a counter in a kitchen. The working surface is usually covered by either linoleum or by a plastic material such as Formica which may be bonded to a plywood sheet. The drawings may be taken to represent a plywood sheet having as its uppermost veneer a sheet of Formica 22.

Molding 10 is formed of a single strip of material having an upright wall 30, a top section 32 covering the edge of Formica sheet 22 and a bottom section 34 covering the underside of the counter edge 20. Wall 30 could be formed so as to lie wholly in a vertical plane in its secured position as shown in Figure 5 but it is preferred to have a slightly convex surface. Wall 30 is straightened somewhat from the curvature shown in Figure 2 as the molding is sprung on counter edge 20.

Top section 32 terminates in a declivous extreme edge portion 40 which extends obliquely from the remainder of the top section and exposes the sharp edge corner 42 for single line contact with the face of the working surface 22. If the veneer 22 were of linoleum, edge 42 would form a crease at 44 in the face of the linoleum which would assist in securing the molding in place. However when a harder surface is used such as Formica, it is desirable to make a score line 44 to receive the sharpened edge corner 42. This score line may or may not be used with linoleum or like sheet material depending upon the characteristics of the sheet.

Bottom section 34 extends from upright wall 30 in an acclivous portion 50 which is joined by a declivous portion 52. The joinder of the acclivous and declivous portions forms a ridge 54 which presses against the underside of counter edge 20 at a point spaced substantially the same distance from upright wall 30 as score line 44. It will be observed that it is necessary that ridge 54 and the exposed corner 42 be spaced the same distance from wall 30 in securing the molding to the counter because with unequal spacing the molding would tend to cant or snap off the counter edge 20. With the present arrangement, the facing molding will stay in place in all conditions of normal use. Declivous portion 52 of the bottom section forms an inclined plane to facilitate the passing of the bottom section past the lower corner 60 of counter edge 20 as will be observed from Figures 3 to 5. In the specification and claims the molding is described in the position shown in Figure 2 in which sense I describe wall 30 as upright, section 32 as the top, and section 34 as the bottom.

When using the usual ¾ inch stock top for counters and tables, the distance between corner edge or lip 42 and ridge 54 in the condition shown in Figures 1 and 2 is approximately $23/32$ of an inch. Score 44 is scribed $9/32$ of an inch from the base of counter edge 20. These dimensions will indicate the usual size of facing 10.

Molding 10 may be used on sinks, desks, cabinets, and table and counter tops of Formica, and other plastics or linoleum. The application of the molding to the edge as shown in Figures 3 to 5 is accomplished by placing corner 42 over the top surface 22 and springing the facing into place with declivous portion 52 riding over corner 60. Score line 44 may be scribed in working surface 22 before the molding is positioned, or the molding may be withdrawn slightly as shown in 44, and the score line made by a scribing tool 70 after which corner 42 is dropped into score line 44. This score will permit the lip of facing 10 to firmly grip this type of material. When used over linoleum a piece of shim stock (nailed to doweling for hand grip) should be inserted between base 22 and corner 42 until the latter is in place, then the shim stock is removed and at the same time lower lip 34 is sprung into place in the same manner as using a shoe horn. The sealing against moisture is accomplished by the pressure of corner 42 and ridge 54 against opposite faces of exposed edge 20. The saving of labor in the simple installation of the facting 10 will be evident.

It is believed that it will be clearly apparent from the above description and the disclosure in the drawings that the invention comprehends a novel construction of a spring-on, spring-tight facing molding for the edges of panels and the like.

Having thus disclosed the invention, I claim:

1. The combination with a table member forming a flat working surface having an exposed nosing edge, of a spring-on facing molding having an upright concavo-convex wall of greater width than said edge covering said edge, having a top flange covering the upper face of said working surface adjacent said edge and having a bottom flange covering the underside of said table member adjacent said edge, said concavo-convex wall, top flange and bottom flange of said molding being formed of a single strip of resilient metal and the top and bottom flanges being spread from their normal position whereby the table member is resiliently clamped by said molding, the extreme edge portion of said top flange being declivous and extending obliquely from the remainder of said top flange and exposing a depending sharp edge corner having single line contact with said face of said working surface, said working surface having a score parallel to said edge in which said sharp edge corner is positioned, said bottom flange consisting of an acclivous portion joined by a declivous camming portion forming the inner edge of said bottom flange, the joinder of said acclivous and declivous portions of said bottom flange forming an upstanding ridge, pressing in line contact against the underside of said working surface, on a line spaced the same distance from said wall as said sharp edge corner, and said ridge and depending corner normally being spaced a lesser distance apart than the upper and lower surfaces of said table member so that the molding must be sprung into place by the use of said declivous camming bottom flange portion.

2. A spring-on, spring-tight facing molding to cover the exposed nosing edge of a counter or the like, comprising: a horizontally elongated upright concavo-convex wall, a top flange extending from the upper edge and a bottom flange extending from the lower edge of the concave surface of said wall defining a channel to grip such edge of a counter or the like, said concavo-convex wall, top flange and bottom flange being formed of a single strip of resilient metal, the extreme edge portion of said top flange of said molding being declivous and extending obliquely from the remainder of said top flange and exposing a depending sharp edge corner for single line contact with the top face of such counter or the like, said bottom flange consisting of an acclivous portion joined to a declivous camming portion forming the free edge of said bottom flange, the joinder of said acclivous and declivous portions of said bottom section forming an upstanding ridge to press in line contact against the underside of such counter or the like beneath the sharp edge corner, said ridge and said sharp edge corner being spaced the same distance from said upright wall in vertical juxtapoistion.

References Cited in the file of this patent

UNITED STATES PATENTS

| 1,277,319 | Joice | Aug. 27, 1918 |
| 1,340,949 | Goodrich | May 25, 1920 |
| 1,568,247 | Schmitz | Jan. 5, 1926 |
| 1,967,666 | Fisher | July 24, 1934 |
| 2,115,130 | Thurn | Apr. 26, 1938 |
| 2,298,578 | Madsen | Oct. 13, 1942 |
| 2,353,777 | Weissert | July 18, 1944 |

FOREIGN PATENTS

| 1,042,977 | France | Nov. 5, 1953 |